US007750591B2

(12) United States Patent
Wang et al.

(10) Patent No.: US 7,750,591 B2
(45) Date of Patent: Jul. 6, 2010

(54) INDUCTION ACTUATED CONTAINER

(76) Inventors: Xin Wang, No. 47, Pushang Zone, Jinshan Industrial Area, Fuzhou, Fujian 350008 (CN); Jiangqun Chen, Rm 801, Building 1, Hualin Garden, Central Lianjiang Rd., Fuzhou, Fujian 350011 (CN); ShiPing Wang, 1608 Beach St., Montebello, CA (US) 90640

( * ) Notice: Subject to any disclaimer, the term of this patent is extended or adjusted under 35 U.S.C. 154(b) by 773 days.

(21) Appl. No.: 11/544,372

(22) Filed: Oct. 7, 2006

(65) Prior Publication Data

US 2008/0084647 A1 Apr. 10, 2008

(51) Int. Cl.
*H02P 1/04* (2006.01)

(52) U.S. Cl. ......................... 318/480; 318/445; 318/16; 318/700; 318/822; 49/28; 49/31; 49/61; 49/63; 49/66

(58) Field of Classification Search ................. 318/480, 318/445, 16, 18, 283, 700, 822, 221; 49/28, 49/31, 61, 63, 66, 67, 73.1
See application file for complete search history.

(56) References Cited

U.S. PATENT DOCUMENTS 4,729,490 A * 3/1988 Ziegenbein ................. 220/211
4,981,275 A * 1/1991 Sheu .......................... 248/147
5,100,264 A * 3/1992 Chang et al. .................. 406/19
5,770,935 A * 6/1998 Smith et al. ................. 318/480
5,932,982 A * 8/1999 Pezzelli, Jr. ................. 318/480
6,150,939 A * 11/2000 Lin ......................... 340/568.1

* cited by examiner

*Primary Examiner*—Rita Leykin
(74) *Attorney, Agent, or Firm*—Raymond Y. Chan; David and Raymond Patent Firm

(57) ABSTRACT

A method of controlling an operation of an induction actuated container cover includes the steps of (a) normally retaining a cover panel of the container cover in a closed position; (b) detecting a target movement of a user by a sensor; (c) generating a first actuating signal to an actuation unit when the sensor detects the target movement of the user; (d) generating an actuation output from the actuation unit to the cover panel of the container cover, wherein the actuation output contains a decelerating and torque enhancing force which moves the cover panel of the container cover at an opened position; (e) pivotally actuating the cover panel of the container cover at the opened position via the actuation output to expose a storage cavity, and (f) generating a second actuating signal to pivotally actuate the cover panel of the container cover back to the closed position.

26 Claims, 4 Drawing Sheets

INDUCTION ACTUATED CONTAINER

BACKGROUND OF THE PRESENT INVENTION

1. Field of Invention

The present invention relates to a container, and more particularly to an induction actuated container which is capable of automatically opening when a user is approaching.

2. Description of Related Arts

A conventional container for storing predetermined objects, such as a trash container, usually comprises a container body having a receiving cavity formed therein, and an opening communicated with the receiving cavity, and a cover panel movably mounted on top of the container body for selectively opening and enclosing the receiving cavity for allowing the user to dispose predetermined objects into the container body. When the container is not in use, the receiving cavity is substantially enclosed for physically separating the objects disposed in the receiving cavity from an exterior of the container.

In a number of situations, such as when a person is holding a lot of trash in both of his hands, it is inconvenient or difficult for the person to lift up the cover panel in that the person simply does not have spare hands to lift up the cover panel. If the person nevertheless tries to lift up the cover panel, he risks dropping all the trash in his or her hands onto the floor.

Because of this deep-seated difficulty with respect to the above-mentioned conventional container, there exist several other kinds of containers in which the cover panels are mainly designed to be actuated by feet instead of hands. These containers have substantially solved the problem of inconvenient or difficult lifting of the cover panel when the user has a lot of, say, trash, in his or her hands. However, they create other problems. For example, a substantially amount of force has to be applied to the paddle in order to lift up the cover panel. This may perhaps pose a certain degree of difficulty for such users as children and elderly. Moreover, since the operation of the containers is mainly relies on stepping force on the part of the user, the paddle would break very easily especially when people apply unknowingly excessive stepping force on it.

In recent years, electrically-operated containers have been developed in which the cover panel is largely driven by electrical components so as to achieve automatic opening or closing of that cover panel. For most of these electrically-operated containers, such as electrically-operated trash cans, a sensor is utilized for detecting a target movement, such as a movement of the person throwing trash, in a detection range, so that when that person stands in that detection range, the sensor will send a signal to the relevant electrical components so as to automatically lift up the cover panel, and when the user has left the detection range, the sensor will send a corresponding signal to those electrical components for automatically lowering down the cover panel so as to close the container.

There are a number of disadvantages in relation to this kind of electrically-powered containers. First, virtually all electrically-powered containers employed some sorts of sensors for detecting user's position so as to determine the exact time at which the cover panel is to be automatically actuated. However, the position of the sensors with respect to the corresponding container body may not be optimal so that the cover panel may be unnecessarily lifted up. This result may also occur when the sensor is too sensitive. Conversely, when the sensor is too insensitive, there may occur a situation where the cover panel does not lift up when in fact it is necessary.

Second, it is well-known in the art that when the cover panel is electrically-powered, it is difficult to effectively control the actual physical motion of the cover panel, especially when the cover panel is driven to lower down to cover the container body. More specifically, when the cover panel is pivotally moved to enclose the container body, gravitational force (due to the weight of the cover panel) has largely been ignored by many so that the cover panel is usually subject to excessive force when being driven to enclose the container body. As a result, it is suggested that some sort of mechanisms is required to actually controllably resist the gravitational force when the cover panel is driven to enclose the container body so as to prevent accidental damage to the electrical components, the container body, or even the cover panel itself.

Third, for some electrically-powered containers (such as trash cans), because of their utility function, are usually placed in an environment which not clean. Similarly, the objects which are to be disposed into the receiving cavity of the container body may contain liquid. All these adverse factors may eventually affect the durability of the electrical components of the relevant electrically-powered containers. Therefore, protection of the electrical components within the container is a very important issue.

SUMMARY OF THE PRESENT INVENTION

A main object of the present invention is to provide an induction actuated container which is capable of automatically opening when a user is approaching, and automatically closing when the user has left.

Another object of the present invention is to provide an induction actuated container which comprises an automatic driving arrangement which is strategically positioned to accurately sense a user's movement for actuating an opening or closing of a cover panel at the optimal time. In other words, the present invention substantially resolves the deep-seated problem of inappropriate actuation of the cover panel as occurred in the above-mentioned conventional containers.

Another object of the present invention is to provide an induction actuated container comprising an automatic driving arrangement which is effectively protected within a control housing against such adverse environmental factor as excess humidity, so as to prolong a general life span of the present invention.

Another object of the present invention is to provide an induction actuated container comprising an automatic driving arrangement which is capable of lifting a cover panel in a controlled manner so as to prevent accidental damage of the electrical components of the automatic driving arrangement when the cover panel is being drive to operate.

Another object of the present invention is to provide an induction actuated container comprising an automatic driving arrangement, wherein the induction actuated container can be adapted to perform a wide variety of functions so as to allow widespread application of the present invention.

Another object of the present invention is to provide a method of controlling an operation of an induction actuated container cover for a container body having a storage cavity, wherein a cover panel is to be actuated between a closed position and an opened position.

Accordingly, in order to accomplish the above objects, the present invention provides a method of controlling an operation of an induction actuated container cover for a container body having a storage cavity, wherein the method comprises the steps of:

(a) normally retaining a cover panel of the container cover in a closed position to enclose the storage cavity of the container body;

(b) detecting a target movement of a user by a sensor within a predetermined detecting range, wherein the user approaches to the sensor at an approaching direction;

(c) generating a first actuating signal to an actuation unit when the sensor detects the target movement of the user;

(d) generating an actuation output from the actuation unit to the cover panel of the container cover, wherein the actuation output contains a decelerating and torque enhancing force which powerful enough to pivotally move the cover panel of the container cover at an opened position in a hydraulic manner;

(e) pivotally actuating the cover panel of the container cover at the opened position via the actuation output to expose the storage cavity of the container body, wherein the cover panel of the container cover is pivotally moved that a cover opening of the container cover faces towards the approaching direction for allowing the user to access the storage cavity of the container body;

(f) generating a second actuating signal after a predetermined time to pivotally actuate the cover panel of the container cover back to the closed position to enclose the storage cavity of the container body.

Moreover, the present invention provides an induction actuated container cover for a container body having a storage cavity and a container opening at an upper portion of the container body, wherein the induction actuated container cover comprises:

a control housing, having a cover opening, adapted for mounting at the container body at the container opening thereof to communicate the cover opening with the receiving cavity of the container body, wherein the cover opening has a width defining between two sidewalls of the control housing;

a cover panel pivotally mounted to the control housing to pivotally move between a closed position that the cover panel covers at the cover opening to enclose the receiving cavity and an opened position that the cover panel exposes the cover opening for communicating with the receiving cavity, wherein the cover panel has two side covering rims covering at two outer side edges of the cover opening of the control housing respectively to maximize an usable area of the cover opening when the cover panel is pivotally moved at the opened position;

an automatic driving arrangement, which comprises:

a sensor mounted on a front portion of the control housing for detecting a target movement of a user; and an actuation unit supported in the control housing at a rear portion thereof, wherein the actuation unit comprises an actuation input operatively linked to the sensor and an actuation output coupling with the cover panel, wherein when the sensor is activated with respect to the target movement, the actuation output generates a decelerating and torque enhancing force to pivotally move the cover panel at the opened position in a hydraulic manner that the cover opening faces towards an approaching direction of the user for allowing the user to access the storage cavity of the container body.

These and other objectives, features, and advantages of the present invention will become apparent from the following detailed description, the accompanying drawings, and the appended claims.

DETAILED DESCRIPTION OF THE PREFERRED EMBODIMENT

Figure 1:
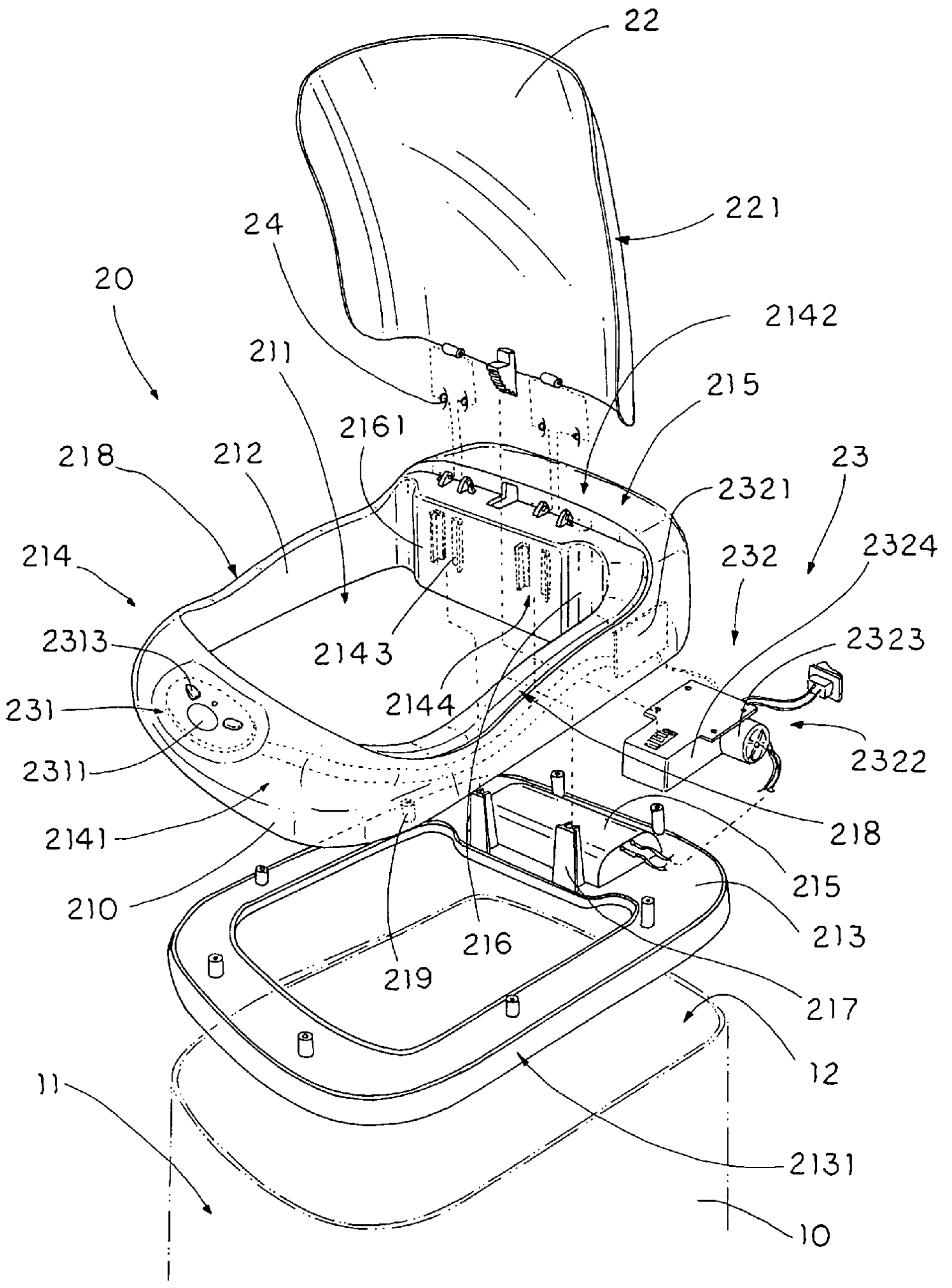
FIG. 1 is an exploded perspective view of the induction actuated container according to a preferred embodiment of the present invention.
Figure 2:
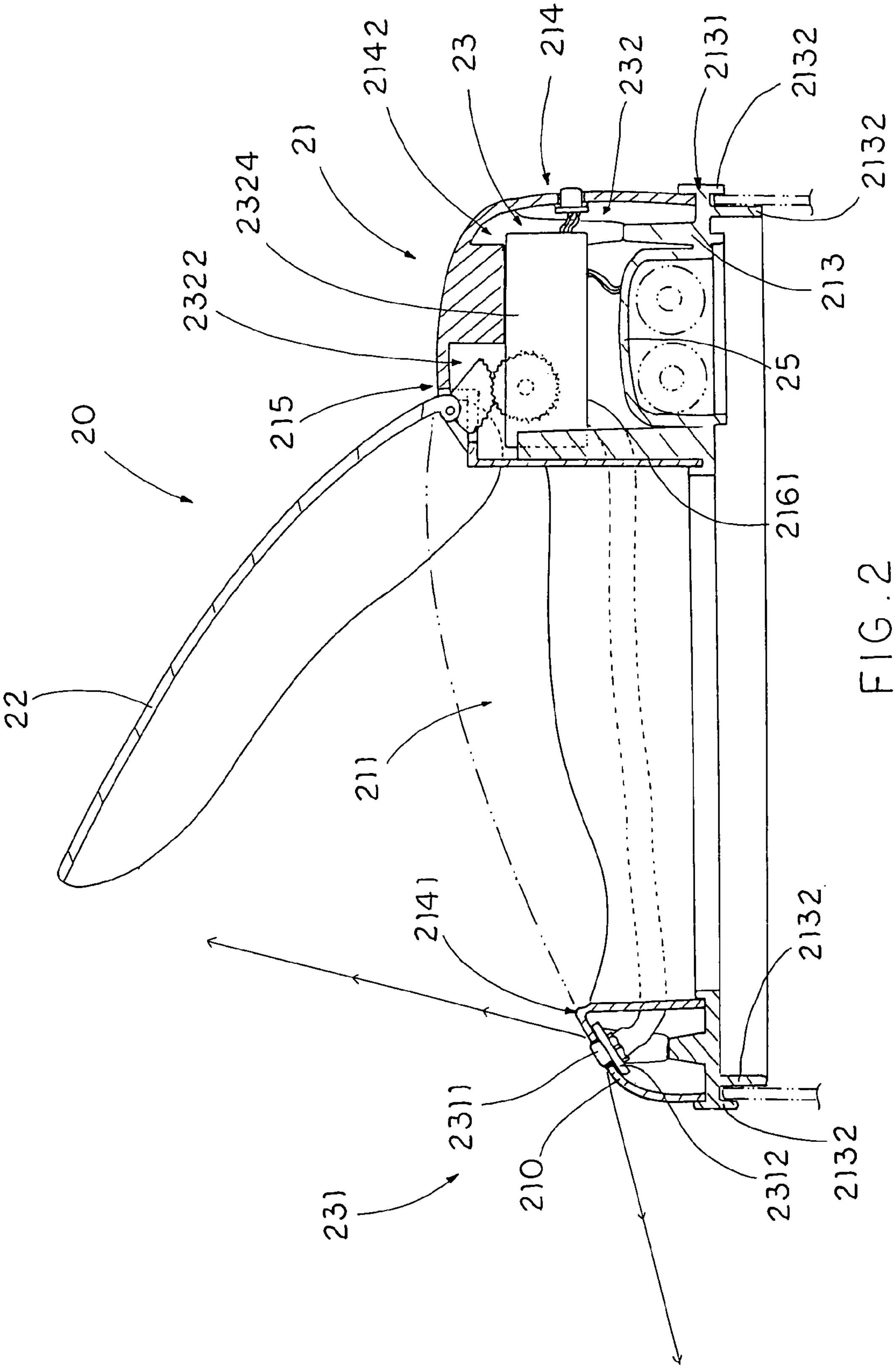
FIG. 2 is a sectional side view of the control housing of the induction actuated container according to the above preferred embodiment of the present invention.
Figure 3:
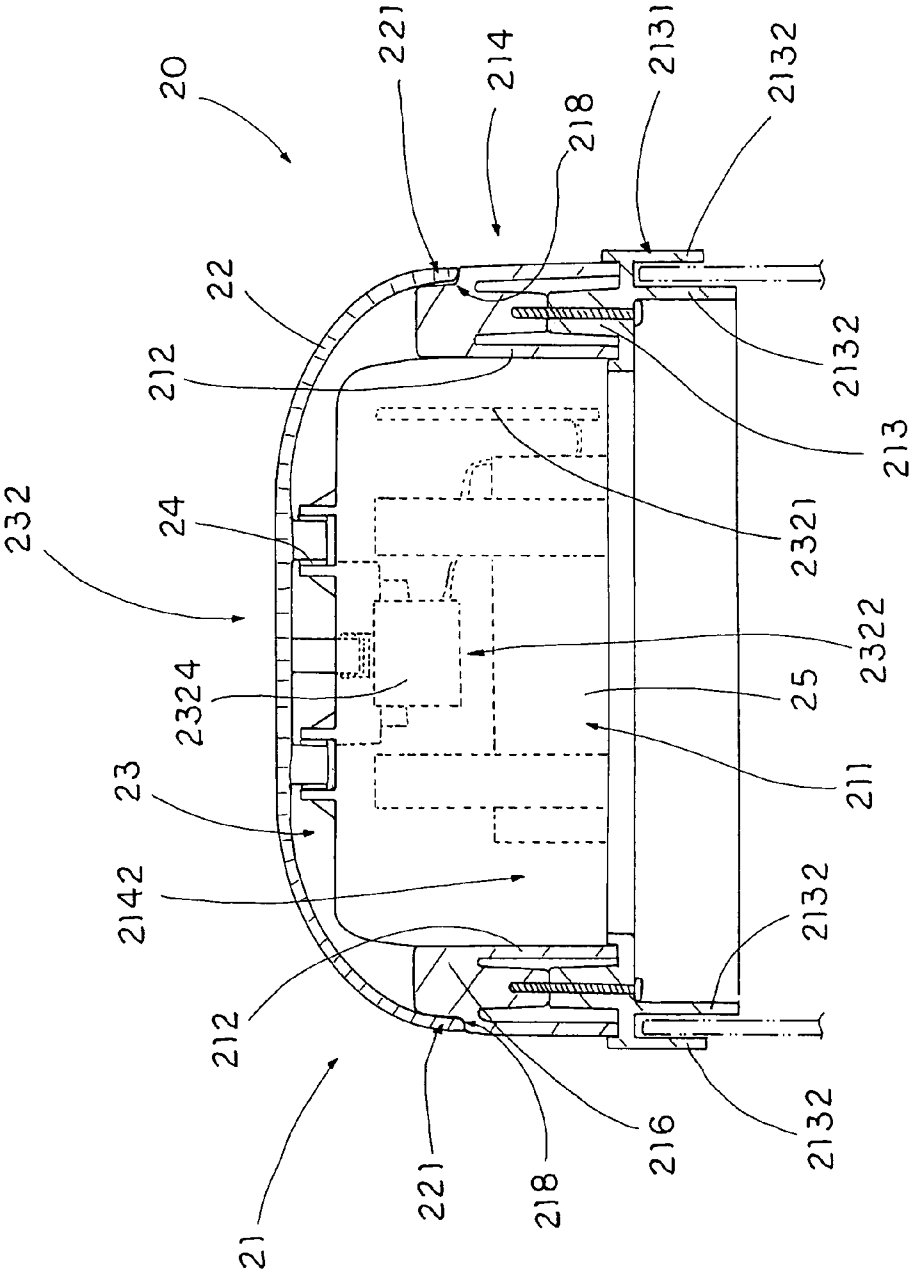
FIG. 3 is a sectional front view of the control housing of the induction actuated container according to the above preferred embodiment of the present invention.
Figure 4:
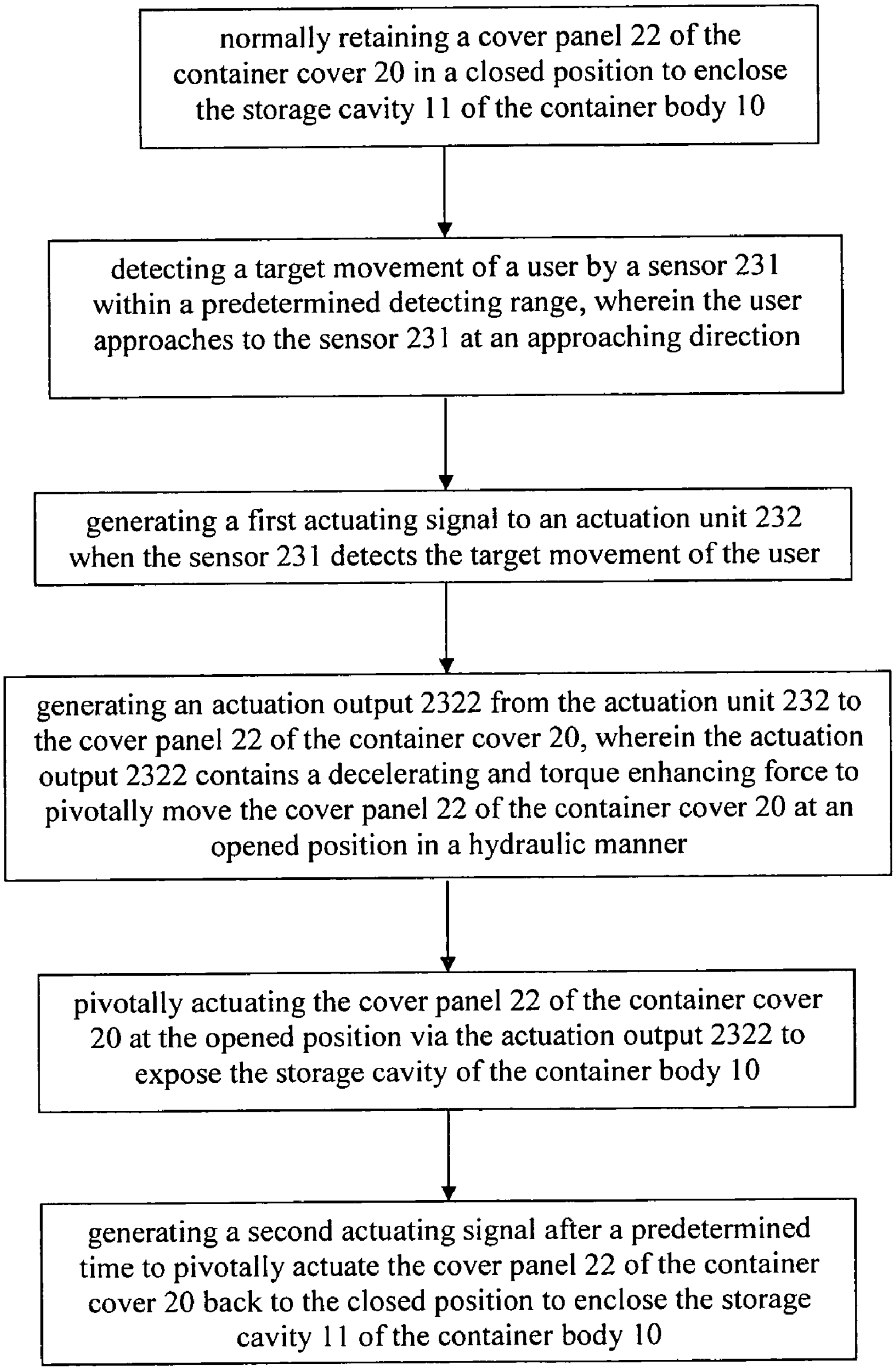
FIG. 4 is a method of controlling an operation of an induction actuated container cover according to the above preferred embodiment of the present invention.

Referring to FIG. 1 to FIG. 3 of the drawings, an induction actuated container according to a preferred embodiment of the present invention is illustrated, in which the induction actuated container comprises a container body 10, and an induction actuated container cover 20.

The container body 10 has a storage cavity 11 and a container opening 12 formed at an upper portion of the container body 10, wherein the storage cavity 11 is utilized for storing predetermined objects, such as trash, disposed by a user of the present invention.

The induction actuated container cover 20 comprises a control housing 21, a cover panel 22 and an automatic driving arrangement 23. The control housing 21, having a cover opening 211, is adapted for mounting at the container body 10 at the container opening 12 thereof to communicate the cover opening 211 with the receiving cavity 11 of the container body 10, wherein the cover opening 211 has a width being defined between as the width between the two sidewalls 212 of the control housing 21.

The cover panel 22 is pivotally mounted to the control housing 21 to pivotally move between a closed position that the cover panel 22 covers at the cover opening 211 to enclose the receiving cavity 11, and an opened position that the cover panel 22 exposes the cover opening 211 for communicating with the receiving cavity 11, wherein the cover panel 22 has two side covering rims 221 covering at two outer side edges of the cover opening 211 of the control housing 21 respectively to maximize an usable area of the cover opening 211 when the cover panel 22 is pivotally moved at the opened position.

The automatic driving arrangement 23 comprises a sensor 231 and an actuation unit 232. The sensor 231 is mounted on a front portion of the control housing 21 for detecting a target movement of the user.

The actuation unit 232 is supported in the control housing 21 at a rear portion thereof, wherein the actuation unit 232 comprises an actuation input 2321 operatively linked to the sensor 231 and an actuation output 2322 coupling with the cover panel 22, wherein when the sensor 231 is activated with respect to the target movement, the actuation output 2322 generates a decelerating and torque enhancing force to pivotally move the cover panel 22 at the opened position in a hydraulic manner that the cover opening 211 faces towards an approaching direction of the user for allowing the user to access the storage cavity 11 of the container body 10.

According to the preferred embodiment of the present invention, the control housing 21 is adapted to fittedly cover on top of the container body 10 so as to selectively enclose the storage cavity 11, wherein the cover opening 211 is well-aligned with the container opening 12 in such a manner that when the cover panel 22 is in the opened position, the storage cavity 11 is exposed to an exterior of the container body 10 via the cover opening 211. As a result, the user is able to dispose the objects, such as trash, into the storage cavity 11.

The cover opening 211 is formed between two sidewalls 212 of the control housing 21, wherein the control housing 21 has two L-shaped retaining slots 218 indently formed at the two outer sidewalls 212 of the control housing 21 to engage with the two side covering rims 221 of the cover panel 22 respectively for fittedly enclosing the cover opening 211 when the cover panel 22 is at the closed position.

Moreover, it is important to point out that a height of the control housing 21 is gradually decreasing from a rear side thereof to a front side of the control housing 21 so as to constitute a substantially trapezoidal cross section when viewed from the side (FIG. 2 of the drawings). As a result, when the user is approaching the induction actuated container from a front side thereof, his movement would trigger the actuation of the cover panel 22 for being driven to move from the normal closed position to the opened position, and expose the maximum area over which the user could dispose the objects into the storage cavity 11.

Referring to FIG. 1 to FIG. 3 of the drawings, the actuation unit 232 of the automatic driving arrangement 23 is position at a rear upper portion of the control housing 11 such that any unwanted residuals, such as trash residuals, which are accidentally disposed onto the control housing 21 is arranged to be naturally guided (by gravitational force) to slide towards the front side of the control housing 21 so as to minimize the chance of the unwanted residuals adversely affecting the actuation unit 232.

Accordingly, the control housing 21 comprises a base sealing frame 213 having a peripheral sealing edge 2131 adapted for sealingly covering the container opening 12 of the container body 10, and a main housing body 214, having the substantial trapezoid cross section to define the two sidewalls 212 of the control housing 21 and a top slanted ceiling 215 thereof, provided on top of the base sealing frame 213, wherein the cover opening 211 of the control housing 21 is formed on the top slanted ceiling 215 to align with the container opening 12 of the container body. Hence, the cover panel 22 is pivotally provided at the top slanted ceiling 215 for being driven to move between the normal closed position and the opened position.

Since the main housing body 214 has a trapezoidal cross section, a height of the front portion of the control housing 21 is shorter that that of the rear portion thereof, and the cover opening 211 is formed on the slanted ceiling 215 of the housing body 214 between the front and rear portions of the control housing 21 such that a surrounding wall of the cover opening 211 is extended inclinedly to maximize an opening area of the cover opening 211.

The control housing 21 further comprises a protection boundary 216 provided in the main housing body 214 and peripherally encircles the cover opening 211 underneath thereof to divide the main housing body 214 into a front access portion 2141 and a rear actuation compartment 2142, wherein the actuation unit 232 is securely received within the actuation compartment 2142 for driving the cover panel 22 to move between the closed position and the opened position.

More specifically, a rear enclosing wall 2161 of the cover opening 211 is upwardly extended to pivotally connect to a rear edge of the cover panel 22 to partition the housing body 214 to the front access portion 2141 in front of the rear enclosing wall 2161 and the rear actuation compartment 2142 behind the rear enclosing wall 2161, wherein the actuation unit 232 is supported within the rear actuation compartment 2142 in an enclosed manner for sealedly separating the actuation unit 232 from the cover opening 211.

Moreover, the peripheral sealing edge 2131 of the base sealing frame 213 has two parallel sealing walls 2132 extending downwardly to define a sealing channel therebetween for receiving the surrounding edge of the container opening 12 between the two sealing walls 2132 so as to sealedly mount the control housing 21 on the container body 10.

Referring to FIG. 2 of the drawings, the control housing 21 further comprises a plurality of reinforcing ribs 217 upwardly and integrally extended from the base sealing frame 213 to engage with the main housing body 214 for preventing a lateral movement between the base sealing frame 213 and the main housing body 214 and reinforcing a strength of the control housing 21 when the automatic driving arrangement 23 is operating. More specifically, the main housing body 214 further comprises a plurality of elongated guiding members 2143 spacedly provided within the actuation compartment 2142 to form a corresponding number of guiding slots 2144 between each two guiding members 2143, wherein the reinforcing ribs 217 are slidably inserted into the guiding slots 2144 respectively so as to substantially prevent the lateral movement between the base sealing frame 213 and the main housing body 214. With all these features, the general life span of the induction actuated container of the present invention can be maximally prolonged.

In order to further enhance the strength of the control housing 21, the control housing 21 further comprises a plurality of first screw posts 219 downwardly extended from the housing body 214 and a plurality of second screw posts 2191 upwardly extended from the base sealing frame 213 to align with the first screw posts 219 respectively, such that the first screw posts 219 are respectively coupled with the second screw posts 2191 end-to-end to substantially support the housing body 214 on the base sealing frame 213. Thus, when the reinforcing ribs 217 slidably engage with the guiding members 2143 respectively, the reinforcing ribs 217 not only guide the second screw posts 2191 alignedly coupled with the first screw posts 219 respectively but also substantially prevent a lateral movement between the base sealing frame 213 and the main housing body 214.

The sensor 231 of the automatic driving arrangement 23 comprises a sensing unit 2311 mounted at a front side of the control housing 21 for delivering a sensor signal from a front side of the control housing 21 to detect a user's movement in front of the container body 10. The sensor 231 further comprises a sensor circuit 2312 mounted within the main housing body 214, and electrically connected to the actuation input 2321 and the sensing unit 2311 in such a manner that when the sensing unit 2311 detects the user's movement in front of the container body 10, the sensor circuit 2312 will send a corresponding sensor signal to the actuation input 2321 for actuating the cover panel 22 to move from the normal closed position to the opened position. According to the preferred embodiment of the present invention, the sensor circuit 2312 is mounted in front of the protection boundary 216 and is electrically connected to the actuation input 2321 of the automatic driving arrangement 23, preferably by an electric cable.

It is worth mentioning that the control housing 21 has a slanted front wall 210 that the sensor 231 is inclinedly supported at the front wall 210 of the control housing 21, such that the sensor 231 is located in front of the cover panel 22 to maximize the detecting range of the sensor 231 at the approaching direction for detecting the target movement.

The actuation input 2312 comprises an actuation control circuit securely mounted within the rear actuation compartment 2142 of the main housing body 214 for generating an actuation signal to the actuation output 2322 when it receives the sensor signal transmitted from the sensor circuit 2312.

On the other hand, the actuation output 2322 comprises an electric driving unit 2323, such as a servo motor, and a gear transmission unit 2324 mounted in within the rear actuation compartment 2142 of the main housing body 214 and is operatively communicated with the cover panel 22, in such a manner that when the actuation output 2322 is actuated by the actuation signal, the servo motor is driven to operate for providing rotational power which is transmitted by the gear transmission unit 2324 for controllably lifting up the cover panel 22 at a speed determined by the gear ratios of the gear transmission unit 2324. It is worth mentioning that, with the help of the gear transmission unit 2324, the cover panel 22 can be lifted up and down in a manner as though it is lifted up and down hydraulically, i.e. generation of a decelerating and torque enhancing force in a stable and controllable manner.

Referring to FIG. 2 and FIG. 3 of the drawings, the induction actuated container cover 20 further comprises a plurality of resilient elements 24 mounting between a rear edge of the cover panel 22 and the main housing body 214 for normally applying an urging force as an initial force towards the cover panel 22 for initially pushing up the cover panel 22 simultaneously when the decelerating and torque enhancing force starts to pivotally move the cover panel 22 at the opened position.

Moreover, the induction actuated container cover 20 further comprises a power supply unit 25 provided within the main housing body 214 and electrically communicated with the automatic driving arrangement 23 for providing power thereto. According to the preferred embodiment of the present invention, the power supply unit 25 is adapted for receiving a plurality of batteries (such as a plurality of conventional disposable batteries) which acts as energy source for operating the automatic driving arrangement. Alternatively, the power supply unit 25 may be electrically connected to an external AC power source or utilizes rechargeable batteries for providing power to the automatic driving arrangement 23. In any event, however, hydraulics power is not needed, yet the cover panel 22 can be controllably lifted up and down as though hydraulics equipments are employed.

The operation of the present invention is as follows: when the automatic driving arrangement 23 is turned on, the sensor 231 is activated to search for user's movement in a detection range, e.g. an area in front of the induction actuated container, and when a user actually enters the detection range and approaches the induction actuated container, the sensor 231 will generate an actuation signal to the actuation input 2321 which then activates the actuation output 2322 for controllably lifting up the cover panel 22 from the closed position to the opened position, and when the user leaves the detection range, the sensor 231 will also send another actuation signal to the actuation input 2321 which then actuates the actuation output 2322 for moving the cover panel 22 from the opened position back to the closed position.

It is worth mentioning that, even if the user does not leave the detection range for long, the sensor circuit 2312 is preprogrammed to activate closing of the cover panel 22 when a predetermined time lapses after the cover panel 22 has been opened. This ensures that the cover panel 22 will be closed after a predetermined time period. Thus, it is important to stress that the sensor circuit 2312 can actually pre-programmed in a wide variety of ways so as to fit specific needs of individual manufacturers or users. Moreover, the cover panel 22 may also be manually operated through a plurality of control buttons 2313 provided on the control housing 21.

Referring to FIG. 5 of the drawings, a method of controlling an operation of an induction actuated container cover 20 for a container body 10 having a storage cavity 11, wherein the method comprises the steps of:

(a) normally retaining a cover panel 22 of the container cover 20 in a closed position to enclose the storage cavity 11 of the container body 10;

(b) detecting a target movement of a user by a sensor 231 within a predetermined detecting range, wherein the user approaches to the sensor 231 at an approaching direction;

(c) generating a first actuating signal to an actuation unit 232 when the sensor 231 detects the target movement of the user;

(d) generating an actuation output 2322 from the actuation unit 232 to the cover panel 22 of the container cover 20, wherein the actuation output 2322 contains a decelerating and torque enhancing force which powerful enough to pivotally move the cover panel 22 of the container cover 20 at an opened position in a hydraulic manner;

(e) pivotally actuating the cover panel 22 of the container cover 20 at the opened position via the actuation output 2322 to expose the storage cavity of the container body 10, wherein the cover panel 22 of the container cover 20 is pivotally moved that a cover opening 211 of the container cover 20 faces towards the approaching direction for allowing the user to access the storage cavity 11 of the container body 10;

(f) generating a second actuating signal after a predetermined time to pivotally actuate the cover panel 22 of the container cover 20 back to the closed position to enclose the storage cavity 11 of the container body 10.

According to the preferred embodiment of the present invention, step (a) comprises a step of normally applying an urging force as an initial force by at least a resilient element 24 towards the cover panel 22 for initially pushing up the cover panel 22 simultaneously when the decelerating and torque enhancing force starts to pivotally move the cover panel 22 at the opened position. Thus, the cover panel is easier to be opened by the normal urging force of the resilient element 24.

Step (b) comprises the steps of:

(b.1) sending sensor signal in the detection range for detecting user's movement in the detection range; and (b.2) receiving response signal from the detection range for confirming the user's movement in the detection range. The response signal may be in the form of reflection of the sensor signal from the detection range so that the sensor 231 can detect any difference between the outgoing sensor signal and the incoming response signal.

Moreover, step (b) further comprises a step of inclinedly supporting the sensor 231 at the container cover 20 at a position that the sensor 231 is located in front of the cover panel 22 to maximize the detecting range of the sensor 231 at the approaching direction for detecting the target movement.

Step (e) comprises the steps of:

(e.1) generating a first rotational movement by a motor 2323 of the actuation output 232; and (e.2) converting the first rotational movement of the motor 2323 into the controlled decelerating and torque enhancing force by a gear transmission unit 2324 so as to pivotally lift up the cover panel 22 in a hydraulic manner.

Step (f) comprises the steps of:

(f.1) generating a second rotational movement by a motor 2323 of the actuation output 232, wherein a direction of the rotational movement is opposite to the rotational movement stated in step (e); and (f.2) converting the rotational movement of the motor 2323 into the controlled decelerating and torque enhancing force by a gear transmission unit 2324 so as to pivotally close the cover panel 22 in a hydraulic manner.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An induction actuated container cover for a container body having a storage cavity and a container opening at an upper portion of said container body, wherein said induction actuated container cover comprises:

a control housing, having a cover opening, adapted for mounting at said container body at said container opening thereof to communicate said cover opening with said receiving cavity of said container body, wherein said cover opening has a width defining between two sidewalls of said control housing;

a cover panel pivotally mounted to said control housing to pivotally move between a closed position that said cover panel covers at said cover opening to enclose said receiving cavity and an opened position that said cover panel exposes said cover opening for communicating with said receiving cavity, wherein said cover panel has two side covering rims covering at two outer sides of said cover opening of said control housing respectively to maximize an usable area of said cover opening when said cover panel is pivotally moved at said opened position;

an automatic driving arrangement, which comprises:

a sensor mounted on a front portion of said control housing for detecting a target movement of a user; and an actuation unit supported in said control housing at a rear portion thereof, wherein said actuation unit comprises an actuation input operatively linked to said sensor and an actuation output coupling with said cover panel, wherein when said sensor is activated with respect to said target movement, said actuation output generates a force to pivotally move said cover panel at said opened position in a hydraulic manner that said cover opening faces towards an approaching direction of said user for allowing said user to access said storage cavity of said container body, wherein said cover opening is formed between two outer sidewalls of said control housing, wherein said control housing has two L-shaped retaining slots indently formed at said two outer sidewalls of said control housing to engage with said two side covering rims of said cover panel respectively for enclosing said cover opening.

2. An induction actuated container cover for a container body having a storage cavity and a container opening at an upper portion of said container body, wherein said induction actuated container cover comprises:

a control housing, having a cover opening, adapted for mounting at said container body at said container opening thereof to communicate said cover opening with said receiving cavity of said container body, wherein said cover opening has a width defining between two sidewalls of said control housing;

a cover panel pivotally mounted to said control housing to pivotally move between a closed position that said cover panel covers at said cover opening to enclose said receiving cavity and an opened position that said cover panel exposes said cover opening for communicating with said receiving cavity, wherein said cover panel has two side covering rims covering at two outer sides of said cover opening of said control housing respectively to maximize an usable area of said cover opening when said cover panel is pivotally moved at said opened position;

an automatic driving arrangement, which comprises:

a sensor mounted on a front portion of said control housing for detecting a target movement of a user; and an actuation unit supported in said control housing at a rear portion thereof, wherein said actuation unit comprises an actuation input operatively linked to said sensor and an actuation output coupling with said cover panel, wherein when said sensor is activated with respect to said target movement, said actuation output generates a force to pivotally move said cover panel at said opened position in a hydraulic manner that said cover opening faces towards an approaching direction of said user for allowing said user to access said storage cavity of said container body, wherein said control housing comprises a base sealing frame having a peripheral sealing edge adapted for sealingly engaging with a surrounding edge of said container opening of said container body and a housing body having a trapezoid cross section mounted on said base sealing frame such that a height of said front portion of said control housing is shorter that that of said rear portion thereof, wherein said cover opening is formed on a slanted ceiling said housing body between said front and rear portions of said control housing such that a surrounding wall of said cover opening is extended inclinedly to maximize an opening area of said cover opening.

3. The induction actuated container cover, as recited in claim 1, wherein said control housing comprises a base sealing frame having a peripheral sealing edge adapted for sealingly engaging with a surrounding edge of said container opening of said container body and a housing body having a trapezoid cross section mounted on said base sealing frame such that a height of said front portion of said control housing is shorter that that of said rear portion thereof, wherein said cover opening is formed on a slanted ceiling said housing body between said front and rear portions of said control housing such that a surrounding wall of said cover opening is extended inclinedly to maximize an opening area of said cover opening.

4. The induction actuated container cover, as recited in claim 3, wherein a rear enclosing wall of said cover opening is upwardly extended to pivotally connect to a rear edge of said cover panel to partition said housing body to a front access portion in front of said rear enclosing wall and a rear actuation compartment behind said rear enclosing wall, wherein said actuation unit is supported within said rear actuation compartment in an enclosed manner for sealedly separating said actuation unit from said cover opening.

5. The induction actuation container cover, as recited in claim 3, wherein said peripheral sealing edge of said base sealing frame has two parallel sealing walls extending downwardly to define a sealing channel therebetween for receiving said surrounding edge of said container opening between said two sealing walls so as to sealedly mount said control housing on said container body.

6. The induction actuation container cover, as recited in claim 4, wherein said peripheral sealing edge of said base sealing frame has two parallel sealing walls extending downwardly to define a sealing channel therebetween for receiving said surrounding edge of said container opening between said two sealing walls so as to sealedly mount said control housing on said container body.

7. The induction actuation container cover, as recited in claim 3, wherein said control housing further comprises a plurality of first screw posts downwardly extended from said housing body and a plurality of second screw posts upwardly extended from said base sealing frame to align with said first screw posts respectively, such that said first screw posts are respectively coupled with said second screw posts end-to-end to substantially support said housing body on said base sealing frame.

8. The induction actuation container cover, as recited in claim 6, wherein said control housing further comprises a plurality of first screw posts downwardly extended from said housing body and a plurality of second screw posts upwardly extended from said base sealing frame to align with said first screw posts respectively, such that said first screw posts are respectively coupled with said second screw posts end-to-end to substantially support said housing body on said base sealing frame.

9. The induction actuation container cover, as recited in claim 7, wherein said control housing further comprises a plurality of reinforcing ribs upwardly and integrally extended from said base sealing frame and a plurality of guiding members downwardly extended from said housing body to slidably engage with said reinforcing ribs respectively, wherein when said reinforcing ribs slidably engage with said guiding members respectively, said reinforcing ribs not only guide said second screw posts alignedly coupled with said first screw posts respectively but also substantially prevent a lateral movement between said base sealing frame and said main housing body.

10. The induction actuation container cover, as recited in claim 8, wherein said control housing further comprises a plurality of reinforcing ribs upwardly and integrally extended from said base sealing frame and a plurality of guiding members downwardly extended from said housing body to slidably engage with said reinforcing ribs respectively, wherein when said reinforcing ribs slidably engage with said guiding members respectively, said reinforcing ribs not only guide said second screw posts alignedly coupled with said first screw posts respectively but also substantially prevent a lateral movement between said base sealing frame and said main housing body.

11. The induction actuation container cover, as claimed in claim 1, wherein said control housing has a slanted front wall that said sensor is inclinedly supported at said front wall of said control housing, such that said sensor is located in front of said cover panel to maximize said detecting range of said sensor at said approaching direction for detecting said target movement.

12. The induction actuation container cover, as claimed in claim 3, wherein said control housing has a slanted front wall that said sensor is inclinedly supported at said front wall of said control housing, such that said sensor is located in front of said cover panel to maximize said detecting range of said sensor at said approaching direction for detecting said target movement.

13. The induction actuation container cover, as claimed in claim 10, wherein said control housing has a slanted front wall that said sensor is inclinedly supported at said front wall of said control housing, such that said sensor is located in front of said cover panel to maximize said detecting range of said sensor at said approaching direction for detecting said target movement.

14. The induction actuation cover, as recited in claim 6, wherein said actuation output comprises a servo motor activated by said sensor to generate a rotational power at clockwise and counter clockwise directions, a gear transmission unit having a subsequent increasing gear ratio operatively coupling with said servo motor, and a driving gear rotatably engaging with said gear transmission unit to pivotally drive said cover panel between said opened position and said closed position, such that when said rotational power is generated, said gear transmission unit transmits said rotational power to said decelerating and torque enhancing force to pivotally move said cover panel between said opened and closed positions in a hydraulic manner via said driving gear.

15. The induction actuation cover, as recited in claim 13, wherein said actuation output comprises a servo motor activated by said sensor to generate a rotational power at clockwise and counter clockwise directions, a gear transmission unit having a subsequent increasing gear ratio operatively coupling with said servo motor, and a driving gear rotatably engaging with said gear transmission unit to pivotally drive said cover panel between said opened position and said closed position, such that when said rotational power is generated, said gear transmission unit transmits said rotational power to said decelerating and torque enhancing force to pivotally move said cover panel between said opened and closed positions in a hydraulic manner via said driving gear.

16. The induction actuated container cover, as recited in claim 6, further comprising a plurality of resilient elements spacedly mounted at said control housing to normally apply an urging force as an initial force towards said cover panel for initially pushing up said cover panel simultaneously when said decelerating and torque enhancing force starts to pivotally move said cover panel at said opened position.

17. The induction actuated container cover, as recited in claim 15, further comprising a plurality of resilient elements spacedly mounted at said control housing to normally apply an urging force as an initial force towards said cover panel for initially pushing up said cover panel simultaneously when said decelerating and torque enhancing force starts to pivotally move said cover panel at said opened position.

18. A container, comprising:

a container body having a storage cavity and a top container opening; and an induction actuated container cover, which comprises:

a control housing, having a cover opening, mounting at said container body at said container opening thereof to communicate said cover opening with said receiving cavity of said container body, wherein said cover opening has a width defining between two sidewalls of said control housing;

a cover panel pivotally mounted to said control housing to pivotally move between a closed position that said cover panel covers at said cover opening to enclose said receiving cavity and an opened position that said cover panel exposes said cover opening for communicating with said receiving cavity, wherein said cover panel has two side covering rims covering at two outer sides of said cover opening of said control housing respectively to maximize an usable area of said cover opening when said cover panel is pivotally moved at said opened position;

an automatic driving arrangement, which comprises:

a sensor mounted on a front portion of said control housing for detecting a target movement of a user; and an actuation unit supported in said control housing at a rear portion thereof, wherein said actuation unit comprises an actuation input operatively linked to said sensor and an actuation output coupling with said cover panel, wherein when said sensor is activated with respect to said target movement, said actuation output generates a force to pivotally move said cover panel at said opened position in a hydraulic manner that said cover opening faces towards an approaching direction of said user for allowing said user to access said storage cavity of said container body, wherein said cover opening is formed between two outer sidewalls of said control housing, wherein said control housing has two L-shaped retaining slots indently formed at said two outer sidewalls of said control housing to engage with said two side covering rims of said cover panel respectively for enclosing said cover opening.

19. The container, as recited in claim 18, wherein said control housing comprises a base sealing frame having a peripheral sealing edge sealingly engaging with a surrounding edge of said container opening of said container body and a housing body having a trapezoid cross section mounted on said base sealing frame such that a height of said front portion of said control housing is shorter that that of said rear portion thereof, wherein said cover opening is formed on a slanted ceiling said housing body between said front and rear portions of said control housing such that a surrounding wall of said cover opening is extended inclinedly to maximize an opening area of said cover opening.

20. The container, as recited in claim 19, wherein a rear enclosing wall of said cover opening is upwardly extended to pivotally connect to a rear edge of said cover panel to partition said housing body to a front access portion in front of said rear enclosing wall and a rear actuation compartment behind said rear enclosing wall, wherein said actuation unit is supported within said rear actuation compartment in an enclosed manner for sealedly separating said actuation unit from said cover opening.

21. The container, as recited in claim 20, wherein said peripheral sealing edge of said base sealing frame has two parallel sealing walls extending downwardly to define a sealing channel therebetween for receiving said surrounding edge of said container opening between said two sealing walls so as to sealedly mount said control housing on said container body.

22. The container, as recited in claim 21, wherein said control housing further comprises a plurality of first screw posts downwardly extended from said housing body and a plurality of second screw posts upwardly extended from said base sealing frame to align with said first screw posts respectively, such that said first screw posts are respectively coupled with said second screw posts end-to-end to substantially support said housing body on said base sealing frame.

23. The container, as recited in claim 22, wherein said control housing further comprises a plurality of reinforcing ribs upwardly and integrally extended from said base sealing frame and a plurality of guiding members downwardly extended from said housing body to slidably engage with said reinforcing ribs respectively, wherein when said reinforcing ribs slidably engage with said guiding members respectively, said reinforcing ribs not only guide said second screw posts alignedly coupled with said first screw posts respectively but also substantially prevent a lateral movement between said base sealing frame and said main housing body.

24. The container, as claimed in claim 23, wherein said control housing has a slanted front wall that said sensor is inclinedly supported at said front wall of said control housing, such that said sensor is located in front of said cover panel to maximize said detecting range of said sensor at said approaching direction for detecting said target movement.

25. The container, as recited in claim 24, wherein said actuation output comprises a servo motor activated by said sensor to generate a rotational power at clockwise and counter clockwise directions, a gear transmission unit having a subsequent increasing gear ratio operatively coupling with said servo motor, and a driving gear rotatably engaging with said gear transmission unit to pivotally drive said cover panel between said opened position and said closed position, such that when said rotational power is generated, said gear transmission unit transmits said rotational power to said decelerating and torque enhancing force to pivotally move said cover panel between said opened and closed positions in a hydraulic manner via said driving gear.

26. The container, as recited in claim 25, further comprising a plurality of resilient elements spacedly mounted at said control housing to normally apply an urging force as an initial force towards said cover panel for initially pushing up said cover panel simultaneously when said decelerating and torque enhancing force starts to pivotally move said cover panel at said opened position.

* * * * *